United States Patent
Kisilev

(10) Patent No.: US 7,826,675 B2
(45) Date of Patent: Nov. 2, 2010

(54) FEATURE-AWARE IMAGE DEFECT REMOVAL

(75) Inventor: Pavel Kisilev, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 11/481,285

(22) Filed: Jul. 4, 2006

(65) Prior Publication Data

US 2008/0008397 A1   Jan. 10, 2008

(51) Int. Cl.
*G06K 9/42* (2006.01)
*G06K 9/40* (2006.01)

(52) U.S. Cl. .................. 382/257; 382/275

(58) Field of Classification Search ........... 382/100, 382/107, 118, 128, 129, 130, 131, 132, 133, 382/134, 151, 162, 165, 168, 169, 170, 171, 382/172, 173, 181, 190, 192, 194, 199, 205, 382/206, 207, 220, 225, 240, 260, 267, 268, 382/269, 274, 276, 284, 308; 359/237; 356/2, 356/27, 28, 28.5; 348/142, 700, 701, 239; 396/54, 55; 358/1.9, 509; 345/77
See application file for complete search history.

(56) References Cited

U.S. PATENT DOCUMENTS

| | | | | | |
|---|---|---|---|---|---|
| 5,095,204 | A | * | 3/1992 | Novini | 250/223 B |
| 5,774,177 | A | * | 6/1998 | Lane | 348/88 |
| 5,825,909 | A | * | 10/1998 | Jang | 382/132 |
| 6,167,150 | A | * | 12/2000 | Michael et al. | 382/149 |
| 6,198,529 | B1 | * | 3/2001 | Clark et al. | 356/237.5 |
| 6,542,628 | B1 | * | 4/2003 | Muller et al. | 382/132 |
| 7,408,569 | B1 | * | 8/2008 | Yamaguchi | 348/125 |
| 2003/0012452 | A1 | | 1/2003 | Trifonov | |
| 2004/0027618 | A1 | | 2/2004 | Nakamura | |
| 2004/0086162 | A1 | * | 5/2004 | Doi et al. | 382/131 |
| 2004/0208395 | A1 | | 10/2004 | Nomura | |
| 2006/0276698 | A1 | * | 12/2006 | Halldorsson et al. | 600/340 |

FOREIGN PATENT DOCUMENTS

| | | |
|---|---|---|
| EP | 1429541 | 6/2004 |
| EP | 1608145 | 12/2005 |
| WO | WO2006060496 | 6/2006 |

OTHER PUBLICATIONS

Giakoumis et al., "Digital image processing techniques for the detection and removal of cracks in digitized paintings", IEEE Transactions on Image Processing, vol. 15, No. 1, p. 178-188, Jan. 2006.*

(Continued)

*Primary Examiner*—Andrew W Johns
*Assistant Examiner*—Tahmina Ansari

(57) ABSTRACT

Provided are systems, methods and techniques which use local image properties to determine which potential defects in an image should be corrected. In one representative embodiment, potential defects in an image are identified based on edge sharpness, and measures of strength for the different potential defects are calculated. The measures of strength for the potential defects are then evaluated in view of certain local properties of the image, in an immediate vicinity of such potential defects, in order to identify the image defects to be corrected.

20 Claims, 4 Drawing Sheets

OTHER PUBLICATIONS

Chen et al., "A pseudo top-hat mathematical morphological approach to edge detection in dark regions", Pattern Recognition 35 (2002), p. 199-210.*

Serra et al., "Connected operators and pyramids", Proc. SPIE, vol. 2030, pp. 65-76 (1993); DOI:10.1117/12.146672, Conference Title: Image Algebra and Morphological Image Processing IV, Jul. 1993.*

Nikolaidis et al., "Digital image processing in painting restoration and archiving", Image Processing 2001 Proceedings 2001 International Conference on, 2001, vol. 1, p. 586-589.*

Giakoumis, I. et al., "Digital restoration of painting cracks", Circuits and Systems, 1998. ISCAS '98. Proceedings of the 1998 IEEE International Symposium on, vol. 4, pp. 269-272, 1998.*

Joyeux, et al. "Detection and removal of line scratches in motion picture films," in Proc. IEEE Int. Conf. Computer Vision and Pattern Recognition, 1999, pp. 548-553.*

Merriam-Webster's Collegiate Dictionary, Tenth Edition, Merriam-Webster Inc., 2001, ISBN 0-87779-708-0, pp. 251, and 921.*

Buisson, O., et al.: Deterioration Detection in a Sequence of Large Images; Third Inter. Workshop; Netherlands; Nov. 15, 2007.

Joyeux, et al., "Reconstruction of Degraded Image Sequences. Application to Film Restoration," Image and Vision Computing 19, 2001, pp. 503-516.

Poynton, C., "Frequently Asked Questions About Color," 1997, pp. 1-24.

* cited by examiner

FEATURE-AWARE IMAGE DEFECT REMOVAL

FIELD OF THE INVENTION

The present invention pertains to image-processing systems, methods and techniques, and is particularly applicable to removing defects from a scanned photograph or other image.

BACKGROUND

A significant problem with existing automated techniques for removing dust, scratches and other defects from an image is that such techniques often fail to adequately distinguish actual image features, such as line segments and various textures, from true defects, such as artifacts that arise when scanning a photograph. In addition, such existing techniques often are very poor at isolating low-contrast defects, especially where such low-contrast defects are located in darker regions. Due to the inherent limitations of such techniques, one often is faced with a choice between frequently missing such defects or frequently misclassifying image features as defects.

SUMMARY OF THE INVENTION

The present invention addresses this problem by using local image properties to determine which potential defects in an image should be corrected. In one representative embodiment, potential defects in an image are identified based on their edge sharpness, and measures of strength for the different potential defects are calculated. The measures of strength for the potential defects are then evaluated in view of certain local properties of the image, in an immediate vicinity of such potential defects, in order to identify the image defects to be corrected.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
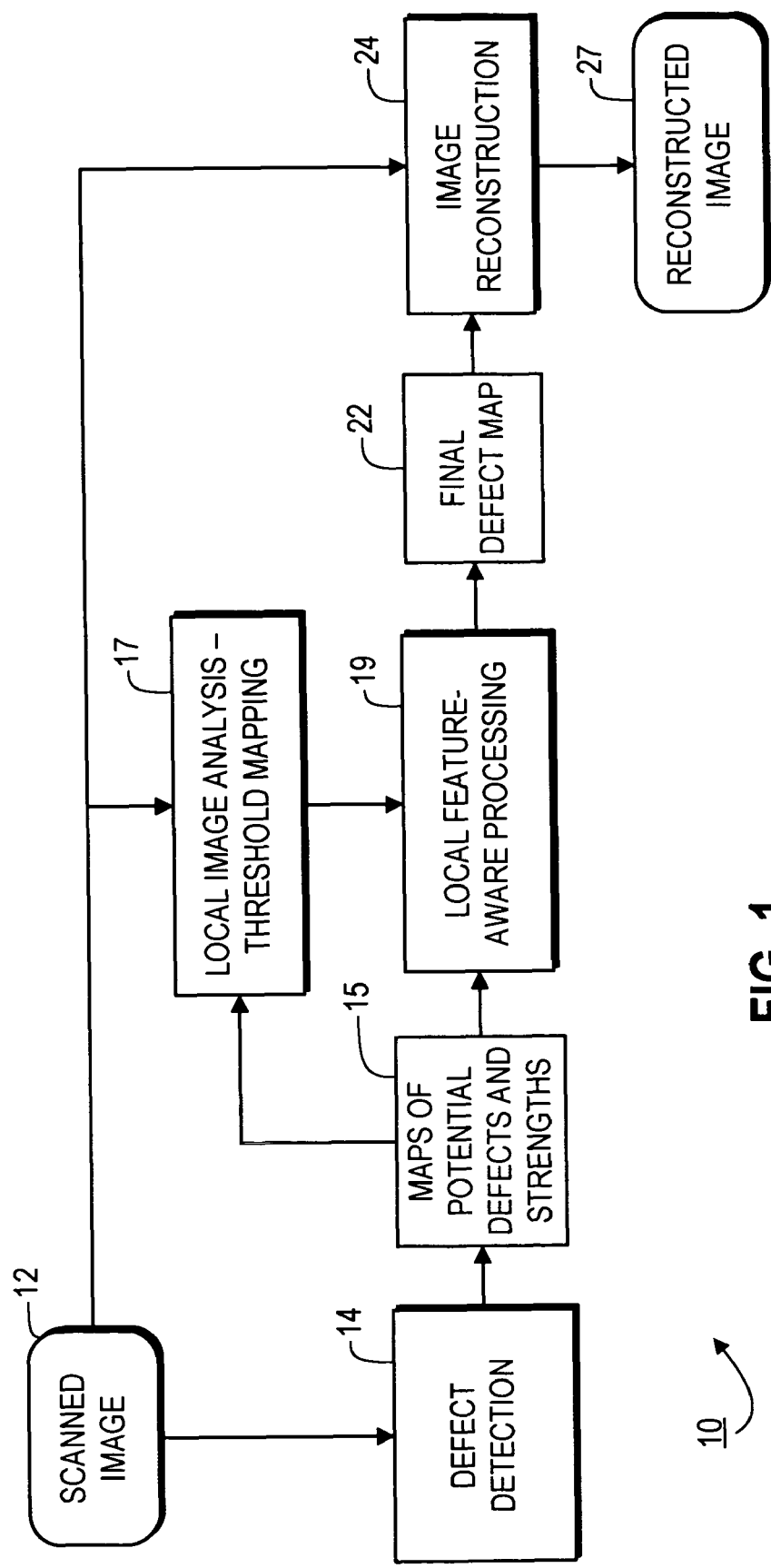
FIG. 1 is a block diagram illustrating a system for removing image defects according to a first representative embodiment of the present invention.

FIG. 1 is a block diagram illustrating a system 10 for removing image defects according to a first representative embodiment of the present invention. As shown, an image 12 (e.g., a scanned photograph or any other digital photograph) is input into system 10.

For purposes of detecting defects, the present invention generally relies on differences in the sharpness of defect edges, as compared to image features. In this regard, a defect in an image may be the result, e.g., of a scratch on the photographic print or of dust, ink or hair on the scanner platen.

Such defects generally can be represented by a closed shape having a peripheral edge, i.e., a relatively thin line or other-shaped curve separating regions of different pixel values. In other words, the edge marks a boundary where an abrupt change in pixel values occurs. In the context of the actual image, such an edge or boundary often is termed an "image feature". In the following discussion, edges, whether defect edges or image features, often are referred to as "features".

The sharpness of an edge indicates how abruptly the pixel values change, i.e., with respect to a change in pixel values between two different regions, how narrow the transition region is between the regions. For example, for very sharp edges the entire change can be observed between two adjacent pixels (or, where the true edge does not fall precisely at a pixel boundary, across three adjacent pixels, although the slope still is two pixels). Other edges reveal somewhat more gradual changes, e.g., across 4-5 pixels, which for a reasonably high-resolution image still would appear fairly sharp to the naked eye.

The above-referenced difference in sharpness is based on the observation that if an image is scanned at a sufficiently high resolution (e.g., 200 dots per inch (dpi) or higher), then defects often reveal sharper edges than the ones of image features. Even though the overall contrast of image features can be higher than the defect contrast, image features usually reveal a greater degree of blur. More specifically, image features usually have a linear, monotonic change in gray-level profile, rather than the bump-like change that is the usual case with defect edges. This difference most likely stems from the fact that image features often are subject to multiple blurs. For example, often the first blurring stage is caused by the optics of the camera with which the photograph was taken. Also, in the case of digital photography, there are various image post-processing steps, such as compression and denoising, causing additional amounts of blurring. Finally, there is blurring when a photograph is scanned, caused by the scanner optics.

In contrast, objects appearing in a scanned image as a consequence of physical defects, e.g., caused by scratches and dust occlusions, are subject to only one blurring stage, namely the one introduced by the optics of the scanner. Accordingly, these features tend to have very sharp bump-like edges.

The initial processing stage 14 of system 10 identifies and outputs potential defects in image 12, together with determinations of measures of the strengths of those defects. More specifically, in the preferred embodiments the potential defects are detected based at least in part on the sharpness of their edges, and the strength of each defect preferably reflects both the sharpness of the corresponding potential defect's edge and the contrast of the potential defect relative to its background.

The preferred technique for identifying such potential defects and determining such measures of strength according to the present invention is morphology-based. Specifically, this technique compares two local maxima maps obtained by applying the Top-hat transform with two different structuring elements and also compares two local minima maps obtained by applying the Top-hat transform with two different structuring elements.

Initially, we discuss some background. Two basic gray-value morphological operations are defined as follows. The gray-value dilation $X \oplus S$ of an image $X[m,n]$ is defined by:

$$(X \oplus S)(m, n) = \max_{[j,k] \in S} \{X[m-j, n-k] + S[j, k]\}.$$

From the definition above, each output coordinate $[m,n]$ of $X \oplus S$ is obtained by first summing a particular structuring element S with a shifted version of the image X. Then, the maximum over all shifts within the J×K domain of S is taken as the result. Image extension (e.g. symmetrical) is used for the boundary areas of X.

The gray-value erosion of an image $X[m,n]$ is defined by:

$$(X \,!\, S)(m, n) = \min_{[j,k] \in S} \{X[m+j, n+k] - S[j, k]\}.$$

Note that using the duality of gray-value dilation and erosion we have:

$$X \,!\, S = -X \oplus \check{S},$$

where $\check{S}$ is obtained by replacing $S[j,k]$ with $S[-j,-k]$.

A special case of the foregoing gray-level morphological operations can be achieved by using a simple structuring element. For example, for the particular case of S=constant=0, the above two operations reduce to a minimum and a maximum over the domain $[j,k] \subset S$:

$$(X \oplus S)(m, n) = \max_{[j,k] \in S} X[m-j, n-k] = \max_S X,$$

and $$(X \,!\, S)(m, n) = \min_{[j,k] \in S} X[m-j, n-k] = \min_S X.$$

Higher-level morphological operations are defined as follows. The gray-value opening is $X \circ S = (X \,!\, S) \subset S$. The gray-value closing is $X \bullet S = (X \subset E) \, S) \,!\, S$. Using duality, $X \bullet S = -X \circ \check{S}$. It is known that the closing operator is suitable for detection of local minima. Therefore, we use it for detection of dark defects (i.e., against a brighter background). In contrast, the opening operator is suitable for detection of local maxima, and so we use it for detection of bright defects (i.e., against a darker background).

The Top-hat transform is calculated as:

$$Y_{dark}(X[m,n],S) = (X \bullet S)[m,n] - X[m,n], \text{ and}$$

$$Y_{bright}(X[m,n],S) = X[m,n] - (X \circ S)[m,n].$$

Note that $Y_{dark}(X[m,n],S)$ reflects the differences between local maxima and a corresponding local background level. Similarly, $Y_{bright}(X[m,n],S)$ reflects the differences between local minima and a corresponding local background level. In other words, these generally can be thought of as the maps of local feature contrast.

In the following discussion, for ease of presentation, we will refer only to the case of dark defects (i.e., against a brighter background), and will omit the indexes "dark" or "bright" in reference to Y. Similar considerations apply to the case of bright defects (i.e., against a darker background).

Defects could be identified in those pixels where the value of $Y_{dark}$ (or $Y_{bright}$) are greater than a predefined threshold $T_1$. The drawback of such an approach, however, is that it does not make a distinction between defects and intrinsic image features, such as line segments and various textures.

Accordingly, in the preferred embodiments we adopt the following approach. We use pyramid-shaped structuring elements, e.g., as discussed in L. Joyeux, S. Boukir, B. Besserer, O. Buisson, "Reconstruction of Degraded Image Sequences. Application to Film Restoration", Image and Vision Computing, 19, 2001, pp. 503-516. More specifically, in the preferred embodiment we build two separate structuring elements as follows:

$$S_1 = \begin{pmatrix} t & t & t \\ t & 0 & t \\ t & t & t \end{pmatrix},$$

$$S_2 = \begin{pmatrix} 2t & 2t & 2t & 2t & 2t \\ 2t & t & t & t & 2t \\ 2t & t & 0 & t & 2t \\ 2t & t & t & t & 2t \\ 2t & 2t & 2t & 2t & 2t \end{pmatrix},$$

where t is an empirically selected parameter, e.g., in the range of 1 to 10. In the inventor's experience to date, the present technique is not particularly sensitive to the precise value used for t.

A structuring element, when used to calculate an opening, acts as a mask, with the resulting map identifying where the mask pattern has been found. Conversely, the same structuring element, when used to calculate a closing, identifies where the inverse of the mask pattern has been found. Thus, $S_1$ will tend to find isolated one-pixel spots having contrast with their background most strongly, but also will identify any line and edge segments. $S_2$ also will tend to find one-pixel spots having contrast with their background, but will provide an even larger-magnitude result if such spots exhibit a linear change in pixel values across three adjacent pixels. Similarly, $S_2$ also will identify edges, and will provide an even larger-magnitude result if such edges exhibit a linear change in pixel value across three adjacent pixels. In other words, $S_1$ and $S_2$ function as masks having different responses to different levels of edge sharpness. The resulting Top-hat transform thus is a function not only of contrast but also edge sharpness, providing an overall measure of the strength of a feature. The sensitivity of the Top-hat transform to feature sharpness depends upon which of structuring elements $S_1$ and $S_2$ has been used.

In order to reveal the discrepancy between very sharp and relatively smoother (or blurred) edges, we calculate the difference between the two Top-hat transforms of an image, obtained for the two different structuring elements $S_1$ and $S_2$, as follows:

$$dY = |Y(X[m,n],S_1) - Y(X[m,n],S_2)|.$$

Very sharp features generally will appear in both Top-hat transforms approximately the same. In contrast, features revealing a monotonic, blurry edge profile will appear more strongly when the second structuring element $S_2$ is used, as compared to those same features obtained with the first structuring element $S_1$.

Therefore, a first indication of whether a particular feature appearing in both maps, $Y(X[m,n],S_1)$ and $Y(X[m,n],S_2)$, corresponds to a defect or is an intrinsic image feature, can be obtained from the difference map, dY. Features whose corresponding dY values are smaller than a predefined threshold $T_{dY}$ (e.g., 1 gray level), are very sharp and, therefore, suspected to correspond to dust, a scratch or some other type of defect.

Consequently, we obtain the initial, thresholded maps of potential defects $Y^{th_1}$ for the two structuring elements by zeroing those pixels in Y where dY is greater than $T_{DY}$:

$$Y^{th_1}(S_1) = \begin{cases} Y(S_1) & \text{if } dY < T_{dY} \\ 0 & \text{otherwise} \end{cases}.$$

Similarly, $$Y^{th_1}(S_2) = \begin{cases} Y(S_2) & \text{if } dY < T_{dY} \\ 0 & \text{otherwise} \end{cases}.$$

Note that $Y^{th_1}(S_1)$ and $Y^{th_1}(S_2)$ are the $T_{dY}$-thresholded maps of differences between local maxima and a corresponding local background level. In other words, these are the $T_{dY}$-thresholded maps of local feature contrast. In the present embodiment of the invention, the thresholded $Y^{th_1}(S_1)$ and $Y^{th_1}(S_2)$ maps 15 (which identify potential defects, together with a measure of the strength of each) are output from detection module 14.

It should be noted that more than two different structuring elements also may be used in the various embodiments of the invention. In fact, additional structuring elements can be useful for identifying defects of different sizes.

For example, calculating the Top-hat transform only with respect to the two structuring elements specifically identified above often will make it difficult to identify very large defects, particularly large defects having low contrast. That is, the technique might identify the border of a defect (which has a very sharp edge), provided that the contrast is large enough, but not the interior of the defect (which might have very little variation or at least generally will not have any sharp variation). Accordingly, some other processing steps generally are desirable to identify defects of different sizes. One approach is to use a number of differently sized structuring elements, with the largest being capable of detecting the largest expected defect. An alternative approach is to use the above two structuring elements applied to several versions, that is, to several different resolutions of the original image, as described in more detail below.

In order to identify larger potential defects, two structuring elements are constructed in a similar manner to that described above, but with a central portion containing more zero-value elements (corresponding to the interior space of a defect). For example, for the next larger scale, the two structuring elements preferably contain a 2×2 rectangle of zeros; for the next larger scale, the two structuring elements preferably contain a 4×4 rectangle of zeros, and so on. Accordingly, the present processing may be repeated with respect to different scales (i.e., for different potential defect sizes), with two structuring elements being used at each scale. Generally speaking, the present embodiment considers only a single scale. The other embodiments described below address in greater detail the considerations for detecting defects of different sizes.

Also, the foregoing description references only one technique for differentiating sharper edges or features from those that are less sharp. However, it should be noted that any of a variety of different edge detection techniques and of sharpness measures may be utilized for this purpose, in accordance with the present invention. In this regard, a technique according to the present invention might instead use two or more different edge detectors, e.g., having different parameters. For example, derivative filters with various degrees of smoothing could be applied to the image 12 for this purpose.

In any event, at the same time that the edges are being identified in processing module 14, local image analysis is performed on the input image 12 in module 17. Such local image analysis is used to further improve the discrimination between intrinsic image features and defects, as well as to adjust the processing with respect to suspected defects. In the preferred embodiments of the invention, we calculate local image properties and use them to generate a feature-dependent threshold map. Finally, such maps are applied to the maps 15 of dark (and bright) defects, $Y^{th_1}$. The following discussion explains certain heuristics behind this technique.

First, the threshold values determined in module 17 preferably are dependent on the local luminance level. In this regard, dark defects appearing in brighter regions have higher perceived contrast than defects of the same brightness appearing in darker regions. Therefore, as a general rule in the present invention, the threshold value is set higher in brighter areas. We note that this heuristic is based solely on human perception (human visual model, HVS) rather than being based on any likelihood that we might have misclassified a potential defect. In other words, this heuristic relies upon certain characteristics of human perception to provide a greater margin of error in certain circumstances.

Second, in busy (e.g., texture-containing or edge-containing) areas defects (e.g., caused by dust occlusions) are less disturbing than defects appearing in smooth areas (another consideration pertaining to human perception that can allow for a greater margin of error in certain circumstances). In addition, in such areas there generally is a higher probability of misclassifying intrinsic image features as defects. This latter consideration is directed toward accommodating errors that might have occurred in generating the map 15 of potential defects. For both of the foregoing reasons, as a general rule in the present invention, in very busy areas the threshold is set higher than in flat, smooth areas.

We, therefore, define a threshold map as a function of three parameters: 1) the mean local luminance level, 2) the local variance, an indicator of the busyness of an area, and 3) the sum of absolute values of local gradients, an indicator of the presence of edges. Thus, in addition to luminance, we consider overall pixel variation across the entire local region (e.g., variance) and also some composite measure of the immediate variations (e.g., variations from pixel to pixel, such as local gradients) within the local region. In other words, two spatial scales of pixel variation are considered within each local region.

Overall pixel variation could indicate the presence of either edges or texture in the local region, while immediate pixel variations indicate the presence of a number of edges in the local region. The local region itself preferably is defined to be larger than the region which was used to identify the edges in detection module 14 (the latter generally only being 2-3 pixels in width). In general, other statistical descriptors also (or instead) can be used; for example, local kurtosis and sparsity can be used in order to detect busy, texture-containing or edge-containing areas.

In the present embodiment of the invention, the first two parameters, the mean local luminance $\mu_B$, and the local variance $s_B$, calculated for a block B, are defined by:

$$\mu_B = \frac{1}{MN} \sum_{m,n \in B}^{M,N} X[m,n],$$

and $$s_B = \frac{1}{MN-1} \sum_{m,n \in B}^{M,N} (X[m,n] - \mu_B)^2.$$

The third parameter in the present embodiment is a sum of absolute values of local gradients; more specifically, we use a simple, zero-order approximation of derivatives:

$$g_B = \sum_{m,n \in B}^{M,N} [(X[m+1,n] - X[m,n])^2 + (X[m,n+1] - X[m,n])^2]^{1/2}.$$

In the preferred embodiments of the invention, we use the following strategy for building a context-adaptive threshold function. First, an initial value $T_0$ for the threshold is set. This value either can be entered interactively by a user, or can be set in advance based on an empirical study. Next, we evaluate the mean and the standard deviation of the empirical distribution of gradient values of sharp edges, that is, the non-zero elements appearing in the maps 15 of defects, $Y^{th_1}(S_1)$ and $Y^{th_1}(S_2)$.

Then, the minimum defect threshold (that is, the lowest allowed defect contrast) is defined as:

$T_{min}(S_1) = \min[T_0, \mu_{Y^{th_1}(S_1)} + C_\sigma \sigma_{Y^{th_1}(S_1)}]$, and $T_{min}(S_2) = \min[T_0, \mu_{Y^{th_1}(S_2)} + C_\sigma \sigma_{Y^{th_2}(S_2)}]$, where $\mu_{Y^{th_1}(S_1)}$ and $\sigma_{Y^{th_1}(S_1)}$ are the empirical mean and the empirical standard deviation of the initial defect map $Y^{th_1}(S_1)$ (and, similarly, for $Y^{th_1}(S_2)$). $C_\sigma$ is a constant that is inversely proportional to the desired detection level, e.g., as defined by a user. Typical values of $C_\sigma$ are between 1 and 6.

The intuition behind this strategy of defining a minimum defect threshold is as follows. If, for example, $T_0$ was set in advance to be 20, but the mean value of the defect contrast, related to $\mu_{Y^{th_1}(S_2)}$, is lower than 20, then using the above definitions will still allow to find the defects with contrast lower than 20. On the other hand, if too many false detections appear, this can be fixed by setting a higher value of $C_\sigma$.

The above threshold values are used as a starting point, and are corrected locally according to a local content of the image. In the present embodiment, this correction is based on the heuristics described above and depends on the values of the three parameters referenced above (i.e., mean local luminance level, local variance and the sum of the absolute values of local gradients). More specifically, in the present embodiment the local, block-dependent threshold is defined by $T_B(S_1) = T_{min}(S_1)[1 + C_1\mu_B + C_2 s_B + C_3 g_B]$, and $T_B(S_2) = T_{min}(S_2)[1 + C_1\mu_B + C_2 s_B + C_3 g_B]$, where $C_1$, $C_2$ and $C_3$ are empirically determined constants. Preferably, these constants are chosen so as to normalize their corresponding parameters; for example, $C_1$, $C_2$ and $C_3$ can be chosen proportional to $1/\max(\mu_B)$, $1/\max(s_B)$, and $1/\max(g_B)$, respectively. In alternate embodiments, non-linear functions of the parameters instead are used. These functions can be defined, for example, based on an HVS model.

In defect-map processing module 19, the above thresholds are then applied to the maps 15 of defects $Y^{th_1}(S_1)$ and $Y^{th_1}(S_2)$, as follows:

$$Y^{th_2}(S_1) = \begin{cases} Y^{th_1}(S_1) & \text{if } Y^{th_1}(S_1) > T_B(S_1) \\ 0 & \text{otherwise} \end{cases},$$

and $$Y^{th_2}(S_2) = \begin{cases} Y^{th_1}(S_2) & \text{if } Y^{th_1}(S_2) > T_B(S_2) \\ 0 & \text{otherwise} \end{cases}.$$

According to the assumption noted above, defects should appear in both maps calculated for two structuring elements. Therefore, we obtain the final map 22 of defects $\Lambda$ by combining the maps for the two structuring elements. Preferably, this is accomplished by component-wise multiplication of the two maps of defects, $Y^{th_2}(S_1)$ and $Y^{th_2}(S_2)$, i.e., $\Lambda = Y^{th_2}(S_1) * Y^{th_2}(S_2)$.

It is noted that the foregoing discussion generally assumes that only a single scale is processed. If multiple scales have been processed in the foregoing manner, then multiple composite defect maps $\Lambda_i$ (one for each different resolution i) are generated from the corresponding pairs of maps. These multiple different maps $\Lambda_i$ are then combined into a single final map 22 of defects $\Lambda$ using an arithmetic operation, such as averaging or taking the maximum on a pixel-by-pixel basis, i.e., $$\Lambda(m,n) = \max_i \{\Lambda_i(m,n)\}.$$

Alternatively, if the defects have been identified using binary symbols (e.g., 1 for a defect or 0 if no defect), then the maps can be combined using the Boolean "OR" operator on a pixel-by-pixel basis. In any event, if the threshold is exceeded for a given pixel at any scale, then that pixel should be deemed a defect to be corrected.

In reconstruction module 24, the original image 12 is modified based on the final defect map 22. Specifically, the pixels in original image 12 corresponding to the defects in final map 22 are replaced with image data based on surrounding pixel data. However, rather than simply using an average of the surrounding pixel data, the present invention preferably uses a direction-sensitive replacement technique that preserves any directional trends in the image data. Thus, for example, if the defect occurs on a feature edge in the original image 12, then the replacement image data preferably maintains that edge.

It should be noted that there actually will be two defect maps 22 at this point: one showing dark defects and one showing bright defects. These are addressed below.

One technique for performing direction-sensitive replacement of image data is based on the closing and the opening operations. First, in order to treat the problem of point connectivity, the map of defective pixels 22 is dilated (although other methods can be used instead). Scanned image pixels are identified as defective if corresponding entries of map 22 have non-zero values. Then, in the case of dark defects, these defective pixels are replaced with corresponding pixels from the closing of image 12. In the case of bright defects, pixels identified as defective are replaced with corresponding pixels from the opening of image 12. That is:

$$X_{dark}([m,n]\epsilon D)=(X\bullet S)[m,n]\epsilon D), \text{ and}$$

$$X_{bright}([m,n]\epsilon D)=(X\circ S)[m,n]\epsilon D),$$

where D is the subset of defective pixels, i.e., the non-zero-value pixels in Λ, and where $S_2$ preferably is used for S. Pixels within X that are not included in D remain unchanged. The original image, with the defective pixels replaced as set forth above, is then output as reconstructed image 27.

Figure 2:
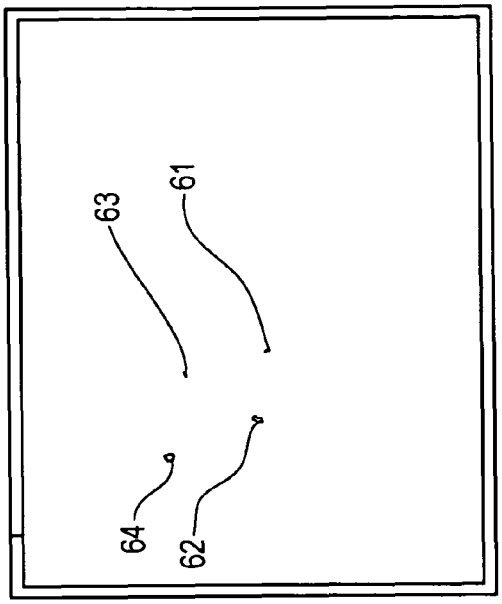
FIG. 2 illustrates a result of the Top-hat transform of an image using a first structuring element according to a representative embodiment of the present invention.
Figure 3:
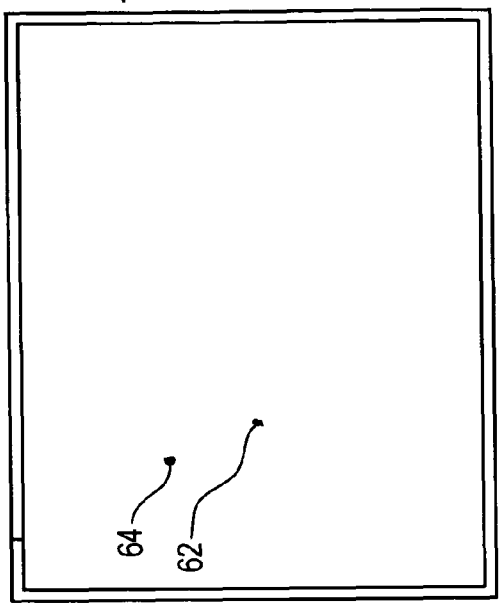
FIG. 3 illustrates a result of the Top-hat transform of an image using a second structuring element according to a representative embodiment of the present invention.

FIGS. 2-5 illustrate an example of the foregoing processing. More specifically, FIG. 2 shows the Top-hat transform 50 of an exemplary image (not shown) using the $S_1$ structuring element set forth above and FIG. 3 shows the Top-hat transform 51 of the same image using the $S_2$ structuring element set forth above (i.e., both with a single zero-value central pixel). As noted above, both of transforms 50 and 51 show the image features (e.g., features 52-54). However, the image features are much stronger in transform 51 than in transform 50, because the image features are somewhat blurred, thereby more closely matching the pattern of structuring element $S_2$. At the same time, defects 61-64 appear identically in both of transforms 50 and 51.

Figure 4:
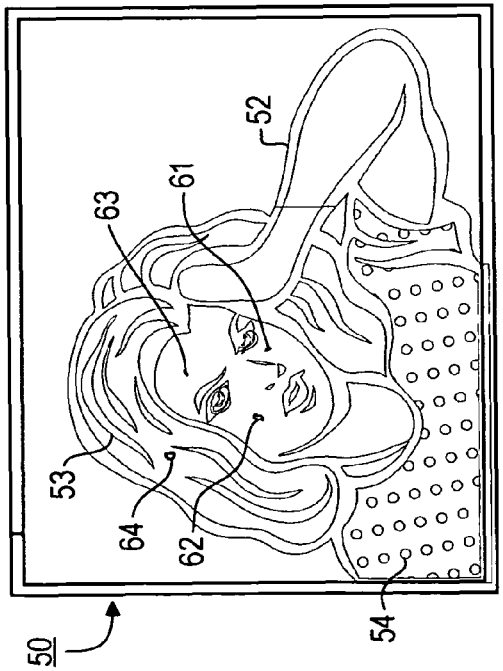
FIG. 4 illustrates a defect map at a first scale according to a representative embodiment of the present invention.

It also is noted that although defects 61 and 63 are identified in their entirety in both transforms 50 and 51, the larger defects 62 and 64 are only shown in outline form. That is, the two structuring elements used are not large enough to capture all of either defect 62 or defect 64. In fact, even the outlines likely would not have been captured unless the contrast was sufficiently high. The resulting defect map 22A, after taking the difference between the two transforms 50 and 51 and then zeroing out any pixels in the transform map (either 50 or 51) having a corresponding difference value less than a specified threshold, is shown in FIG. 4.

Figure 5:
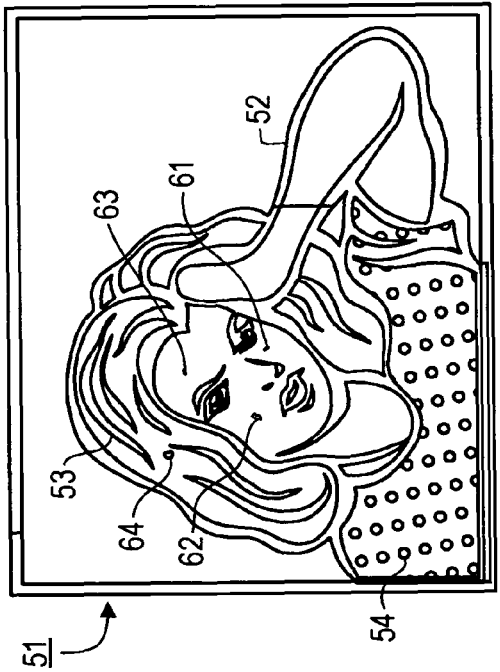
FIG. 5 illustrates a defect map at a second scale according to a representative embodiment of the present invention.

Merely replacing the defective pixels identified in defect map 22A would not eliminate the entire defect 62 or 64, but rather only their perimeters (i.e., making them smaller). Accordingly, this is an example where processing at multiple different scales (corresponding to different defect sizes) is desirable. Processing with a larger pair of structuring elements results in the defect map 22B that is shown in FIG. 5. As can be seen, both of defects 62 and 64 are now captured in their entirety, although neither of defects 61 and 63 is captured in this defect map 22B. However, combining the two defect maps 22A and 22B, e.g., using a Boolean "OR" operation or an arithmetic operation (e.g., max or averaging), would fully identify all defects 61-64.

Other approaches to searching for defects of different sizes, which might be more computationally efficient, involve creating different versions of the original image 12, each having a different resolution. Then, one of the above techniques is applied to each different resolution and the results are combined.

Figure 6:
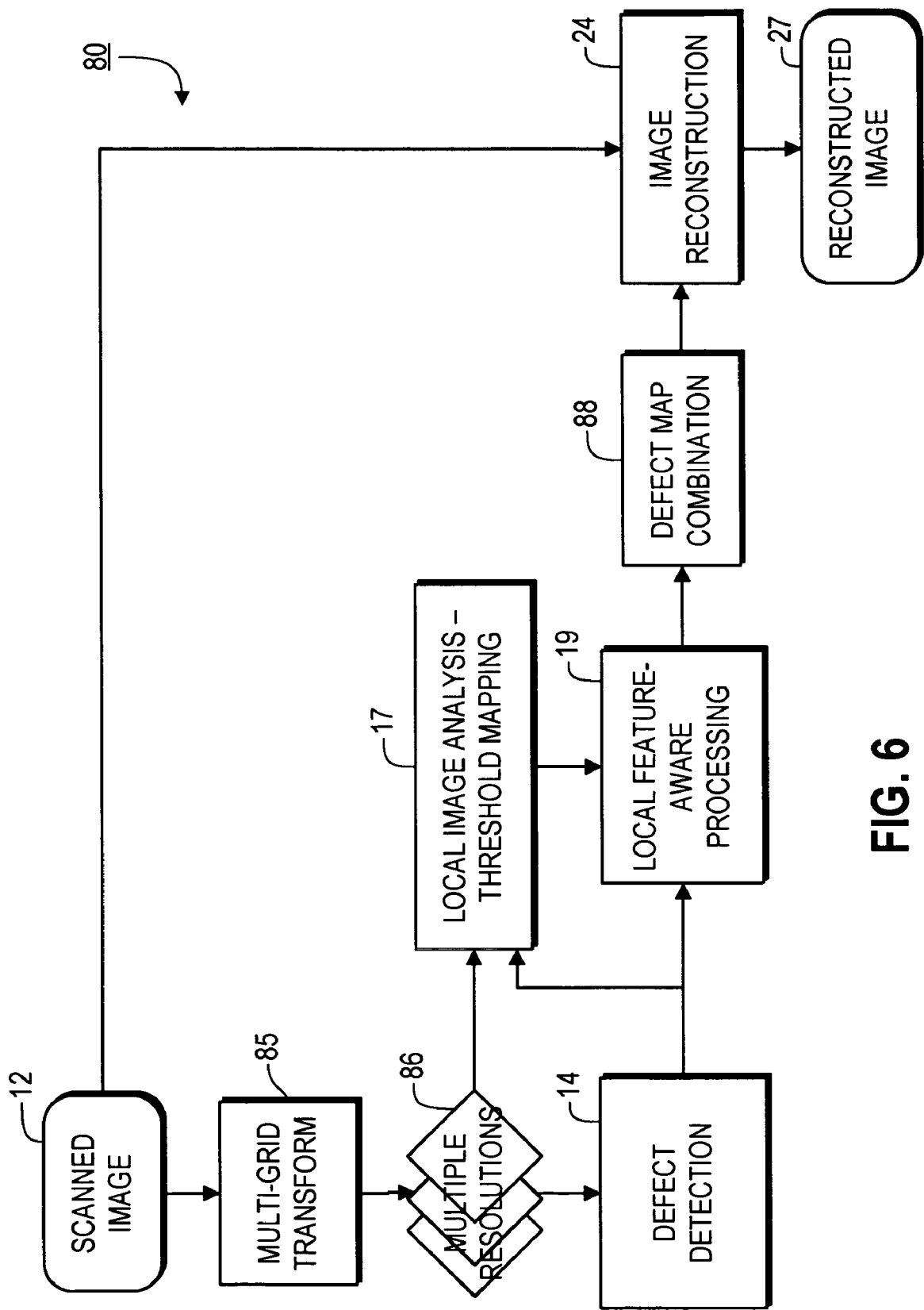
FIG. 6 is a block diagram illustrating a system for removing image defects according to a second representative embodiment of the present invention.

One example of such a system 80 is illustrated in FIG. 6. As will be readily appreciated, many of the processing modules in system 80 are identical to the processing modules having the same element numbers in system 10 (shown in FIG. 1). Accordingly, such processing modules are discussed only cursorily in this embodiment.

One difference in the present embodiment is that the original image 12 is transformed in module 85 into multiple different versions 86, each having a different resolution. This can be performed, e.g., by a downsample-and-average operation, applied to the original image, followed by a recursive downsample-and-average operation applied to each resulting image. Alternatively, images can be created at several resolutions based on multiscale transforms, such as the Wavelet Transform or the Wavelet Packets techniques, or based on any other techniques.

Each resulting image is then processed in modules 14, 17 and 19 as described above. Similar to the processing at different scales described above, a different defect map $\Lambda_i'$ is generated at each resolution i.

In processing module 88, the different defect maps $\Lambda_i'$ first are transformed into the same resolution (e.g., the resolution of the original image 12). Once again, such transformation can be accomplished using any known technique, such as by repeating pixel values, by interpolating or by using transform-based techniques (e.g., with zero padding). The result is a set of defect maps $\Lambda_i$ that can be combined using any of the techniques described above, e.g., averaging, taking the maximum or using the Boolean "OR" operator, on a pixel-by-pixel basis.

Once the defect maps have been combined into a single final map (actually, one for each of the dark and bright defects) in processing module 88, the original image 12 is reconstructed using that map in reconstruction module 24, resulting in the final reconstructed image 27.

Figure 7:
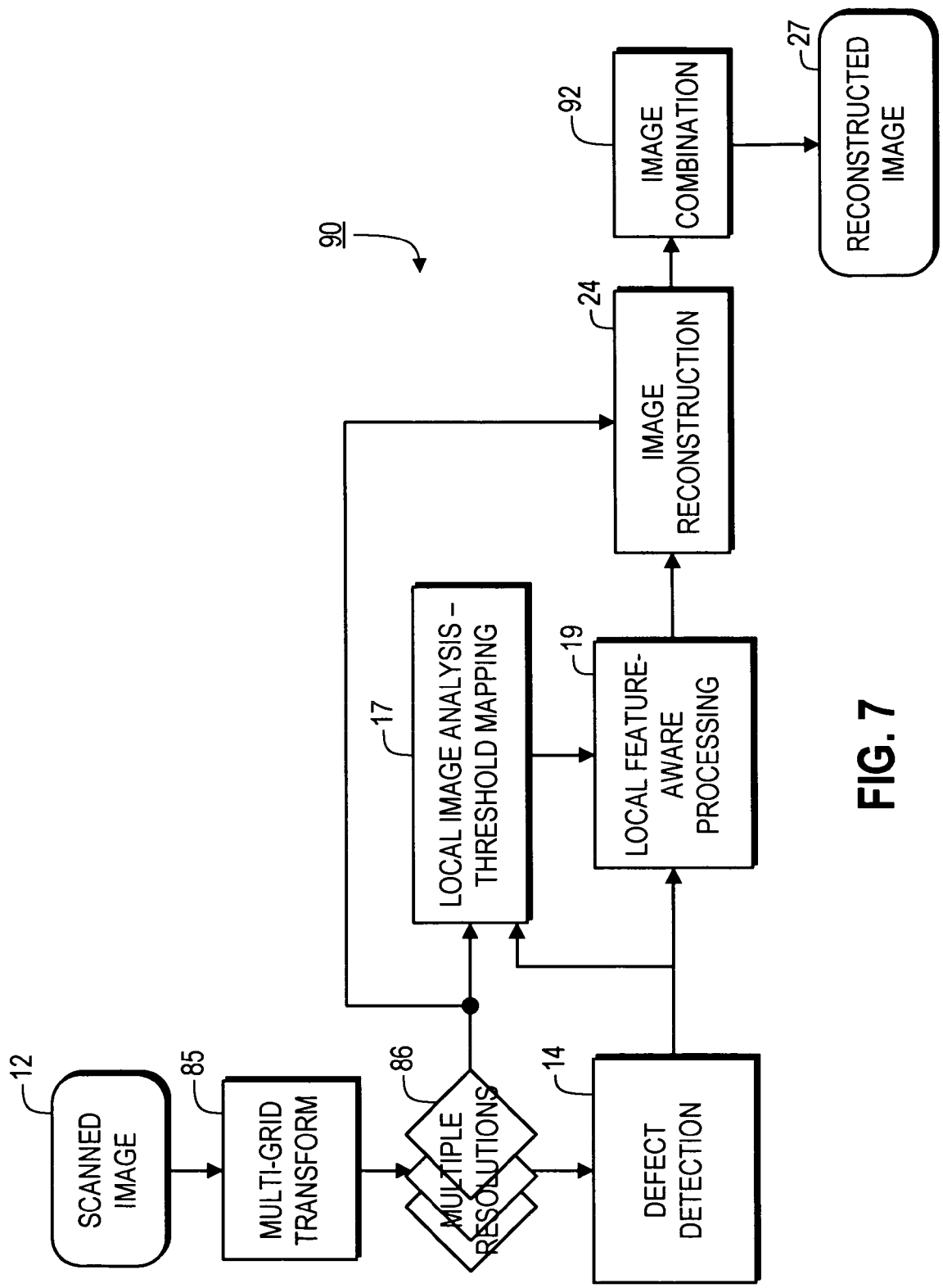
FIG. 7 is a block diagram illustrating a system for removing image defects according to a third representative embodiment of the present invention.

A further embodiment of a system 90 according to the present invention is illustrated in FIG. 7. In this embodiment, once again, multiple versions 86 of the original image 12, each having a different resolution, are generated in multi-grid transform processing module 85. Unlike the immediately preceding embodiment, however, in this embodiment each resulting image is processed identically to how the original image 12 was processed in system 10 (shown in FIG. 1), resulting in a plurality of reconstructed images output by reconstruction processing module 24.

Those individual reconstructed images are then combined in image combination module 92. Because they are at different resolutions, each preferably is converted to a common resolution (e.g., using any of the techniques described above). Then, the resolution-converted images are combined, e.g., using a pixel-by-pixel arithmetic operation (such as averaging) or, on a pixel-by-pixel basis, selecting image data from the different images according to the following priority: (i) if the pixel data has not been replaced in any of the images, selecting the pixel data from the highest-resolution image; or (ii) otherwise, performing an arithmetic operation on, or otherwise calculating a function of, the replaced image data across all images for which the pixel data was replaced (e.g., a simple average or a weighted average based on the images' resolutions). The goal of the latter technique is to use replaced image data wherever possible on the assumption that such data was replaced because a defect was found. In any event, the final combined image 27 is output.

The embodiments described above include various techniques for detecting defects of different sizes. If none of these approaches is adopted, and only the smallest pair of structuring elements is utilized, then often only the perimeter of larger defects will be detected. In such a case, it generally will be desirable to include additional processing to identify any interior pixels after the edge of a defect has been identified.

Also, in the embodiments described above a defect map is generated and is used for correcting an input image. It is noted that the defect map for the present invention may be utilized for other purposes as well. For example, scanner driver software that includes processing according to the present invention can be configured to keep track of the locations of identified defects across multiple scans. Then, if defects repeatedly recur at the same locations the user automatically can be notified that the scanner platen should be cleaned. In more particular embodiments, the user is provided with a map of where the contaminant particles appear to be.

As noted above, the present invention provides for a significant amount of automatic image-defect detection. However, as also noted above, in certain embodiments of the invention the user is provided with the ability to alter some parameters of the technique, e.g., by specifying the defect size, defect contrast, defect detection level or the reconstruction quality. Moreover, in the semi-automatic mode the user can be provided with the ability to mark roughly an image region wherein defects are visible.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and a printer), one or more input devices (such as a mouse, touchpad, tablet, touch-sensitive display or other pointing device; a keyboard, a microphone and a scanner), a mass storage unit (such as a hard disk drive), a real-time clock, a removable storage read/write device (such as for reading from and writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module, requiring the addition of new components or modules, or both. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of removing defects from an image using a computing system, comprising:
    obtaining an image from an input device;
    identifying potential defects in the image based on edge sharpness using a processor;
    determining measures of strength for the different potential defects;
    calculating local properties for different positions within the image using the processor;
    identifying image defects by evaluating the measures of strength for the potential defects in view of the local properties of the image in an immediate vicinity of said potential defects using the processor; and
    replacing image data corresponding to the image defects based on image data surrounding the image defects.

2. A method according to claim 1, wherein the local properties comprise a measure of local pixel-value variation.

3. A method according to claim 1, wherein the local properties comprise a measure of a prevalence of edges in a local vicinity.

4. A method according to claim 1, wherein the potential defects and measures of strength are identified by performing a Top-hat transform with a first structuring element, performing a Top-hat transform with a second structuring element, and comparing the results.

5. A method according to claim 4, wherein the first structuring element and the second structuring element are pyramid-shaped.

6. A method according to claim 1, further comprising steps of:
obtaining copies of the image at different resolutions; and
performing the steps of (i) identifying potential defects, (ii) determining measures of strength and (iii) identifying image defects, for the different resolutions.

7. A method according to claim 6, further comprising a step of combining the image defects identified from the different resolutions.

8. A method according to claim 6, wherein the step of replacing the image data is performed for each of the different resolutions so as to obtain a plurality of reconstructed images, and further comprising a step of combining the reconstructed images into a single corrected image.

9. A method according to claim 1, wherein the step of identifying image defects comprises calculating a threshold map for the image based on the local properties and comparing the measures of strength for the potential defects to corresponding values in the threshold map at positions corresponding to the respective potential defects.

10. A method according to claim 1, wherein the local properties are calculated based on a larger local region than is used to identify edges of the potential defects.

11. A method according to claim 1, wherein the replacing of the image data is based on directional patterns in the image data surrounding the image defects.

12. A method according to claim 1, wherein the measures of strength for potential defects are based on contrast and edge sharpness.

13. A method according to claim 1, wherein the step of identifying potential defects comprises processing the image with a plurality of different masks that produce different results based on edge sharpness.

14. A method according to claim 1, wherein the step of identifying potential defects comprises identifying separate maps of potential defects that are lighter than their backgrounds and potential defects that are darker than their backgrounds.

15. A method of removing defects from an image using a computing system, comprising:
obtaining an image from an input device;
identifying potential defects in the image using a processor, together with measures of strength for the different potential defects, by processing the image with a plurality of different masks that produce different results based on edge sharpness;
generating a threshold map for the image using the processor, the threshold map having a plurality of threshold values corresponding to different locations in the image, with each threshold value being based on image properties only within a local region around the corresponding location;
identifying image defects by comparing the measures of strength for the potential defects to the threshold values corresponding to the locations of the potential defects; and
replacing image data corresponding to the image defects based on image data surrounding the image defects.

16. A method according to claim 15, wherein the image properties comprise a measure of overall pixel-value variation in the local region.

17. A method according to claim 15, wherein the image properties comprise a measure of a prevalence of edges in the local region.

18. A method according to claim 15, wherein the potential defects and measures of strength are identified by performing a Top-hat transform with a first structuring element, performing a Top-hat transform with a second structuring element, and comparing the results.

19. A method according to claim 15, further comprising steps of:
obtaining copies of the image at different resolutions; and
performing the steps of (i) identifying potential defects and measures of strength and (ii) identifying image defects, for the different resolutions.

20. A method according to claim 15, wherein the replacing of the image data is based on directional patterns in the image data surrounding the image defects.

* * * * *